(12) United States Patent
Chuang et al.

(10) Patent No.: US 7,831,578 B2
(45) Date of Patent: Nov. 9, 2010

(54) APPARATUS FOR FILE SYSTEM MANAGEMENT WITH VIRTUAL FILE NAME

(75) Inventors: Chen-Ting Chuang, Pingtung Hsien (TW); Jing-Yen Huang, Tainan (TW)

(73) Assignee: Mediatek, Inc., Hsin-Chu (TW)

( * ) Notice: Subject to any disclaimer, the term of this patent is extended or adjusted under 35 U.S.C. 154(b) by 422 days.

(21) Appl. No.: 11/738,543

(22) Filed: Apr. 23, 2007

(65) Prior Publication Data
US 2007/0255926 A1 Nov. 1, 2007

Related U.S. Application Data

(60) Provisional application No. 60/745,862, filed on Apr. 28, 2006.

(51) Int. Cl.
*G06F 13/00* (2006.01)
(52) U.S. Cl. .................. 707/705; 719/328; 711/203; 718/1; 707/821
(58) Field of Classification Search ............ 707/2, 707/205, 705, 821; 719/328; 711/203; 718/1
See application file for complete search history.

(56) References Cited

U.S. PATENT DOCUMENTS

| 5,758,334 A * | 5/1998 | Knight et al. ............... 707/2 |
| 6,065,010 A * | 5/2000 | Otsuka et al. ............ 707/101 |
| 6,192,471 B1 * | 2/2001 | Pearce et al. ............... 713/2 |
| 7,272,654 B1 * | 9/2007 | Brendel .................. 709/229 |
| 2006/0129558 A1 * | 6/2006 | Brown et al. ............... 707/10 |

* cited by examiner

*Primary Examiner*—Hong Kim
(74) *Attorney, Agent, or Firm*—Thomas, Kayden, Horstemeyer & Risley, LLP (57) ABSTRACT

An apparatus for file system management includes a non-volatile storage device, a volatile memory device, and a processing unit. The non-volatile storage device stores a file containing actual file content. The volatile memory device storing physical file handle context comprises a pointer to the beginning of the actual file content. The processing unit receives a virtual file generation request with a physical file handle corresponding to the physical file handle context, and mapping information of a segment of the actual file content, and generates a virtual file name including the physical file handle and the mapping information.

12 Claims, 10 Drawing Sheets

APPARATUS FOR FILE SYSTEM MANAGEMENT WITH VIRTUAL FILE NAME

CROSS-REFERENCE TO RELATED APPLICATIONS

The present application claims the benefit of U.S. provisional application entitled "VIRTUAL FILE", Ser. No. 60/745,862, filed Apr. 28, 2006, now abandoned.

BACKGROUND

The invention relates to an operating system, and more particularly, to methods and apparatuses for file system management.

In computing, a file system contains various file manipulation methods for storing to and retrieving files from storage devices, such as hard disks, non-volatile memory devices, and others. The file system defines the directory structure for tracking files and path syntax required for accessing files. The file system typically provides several application programming interfaces (API) enabling file manipulation methods to be performed by software applications.

SUMMARY

Apparatuses for file system management are provided. An embodiment of an apparatus for file system management comprises a non-volatile storage device, a volatile memory device, and a processing unit. The non-volatile storage device stores a file containing actual file content. The volatile memory device stores physical file handle context storing a pointer to the beginning of the actual file content. The processing unit receives a virtual file generation request with a physical file handle corresponding to the physical file handle context, and mapping information of a segment of the actual file content, and generates a virtual file name comprising the physical file handle and the mapping information.

An embodiment of an apparatus for file system management comprises a non-volatile storage device, a volatile memory device, and a processing unit. The non-volatile storage device stores a file containing actual file content. The processing unit receives a file open request with a file name, determines whether the file name is a physical file name or a virtual file name, generates and stores physical file handle context in the volatile memory device, comprising a pointer to the beginning of the actual file content when the file name is the physical file name, and assigns a physical file handle corresponding to the physical file handle context. The processing unit generates and stores virtual file handle context in the volatile memory device, comprising the assigned physical file handle, and mapping information of a segment of the actual file content when the file name is the virtual file name, and assigns a virtual file handle corresponding to the virtual file handle context.

An embodiment of an apparatus for file system management comprises a non-volatile storage device, a volatile memory device, and a processing unit. The non-volatile storage device stores a file containing actual file content. The volatile memory device stores physical file handle context comprising a pointer to the beginning of the actual file content, and a current access position from the beginning of the actual file content. The volatile memory device further stores virtual file handle context comprising the assigned physical file handle, a current access position from the beginning of the segment of the actual file content, and mapping information of a segment of the actual file content. The processing unit receives a file seek request with a file handle and forward/reverse distance, determines whether the file handle is the physical file handle or the virtual file handle, and modifies the current access position of the actual file content of the physical file handle context by increasing/decreasing the forward/reverse distance when the file handle is the physical file handle. The processing unit further modifies the current access position of the segment of the actual file content of the virtual file handle context by increasing/decreasing the forward/reverse distance when the file handle is the virtual file handle.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
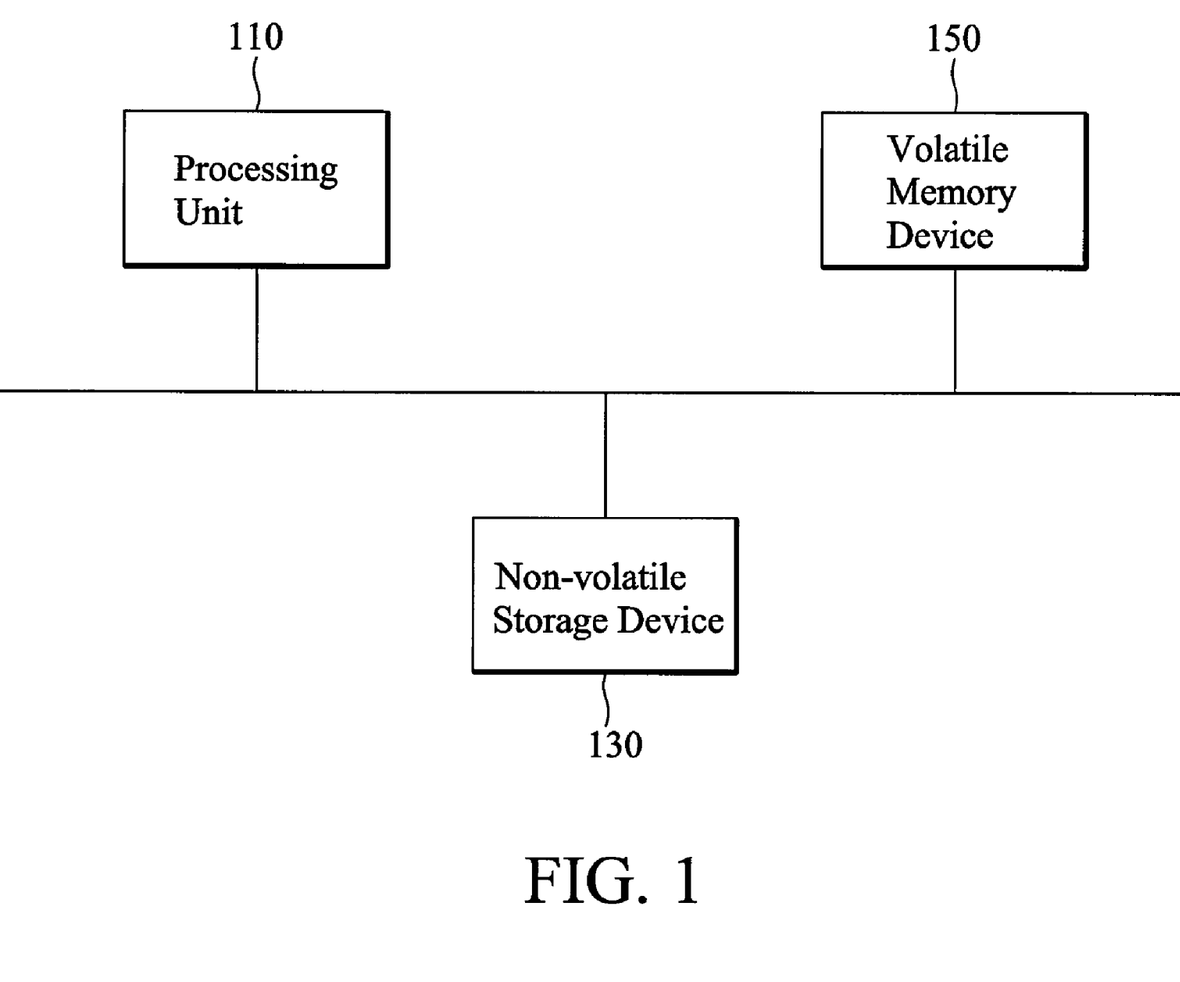
FIG. 1 is a diagram of the hardware architecture of an embodiment of an electronic apparatus for file system management.

FIG. 1 is a diagram of the hardware architecture of an embodiment of an electronic apparatus for file system management, comprising a processing unit 110, a non-volatile storage device 130, and a volatile memory device 150. The processing unit 110 is connected by buses to the non-volatile storage device 130, and the volatile memory device 150. Generally, program modules include routines, programs, objects, components, scripts, Web pages, or others, that perform particular tasks or implement particular abstract data types. The non-volatile storage device 130 may be a flash memory, a memory card, a hard drive, magnetic drive, optical drive, portable drive, or nonvolatile memory drive. The non-volatile storage device 130 provides nonvolatile storage for program modules, files, or others. The volatile memory device 150, such as dynamic random access memory (DRAM), synchronous dynamic random access memory (SDRAM), provides volatile storage for program modules, data structures, or others. The processing unit 110, when loading and executing a file system (i.e. program modules) from the non-volatile storage device 130, provides various operations for manipulating large files in the non-volatile storage device 130.

Figure 2:
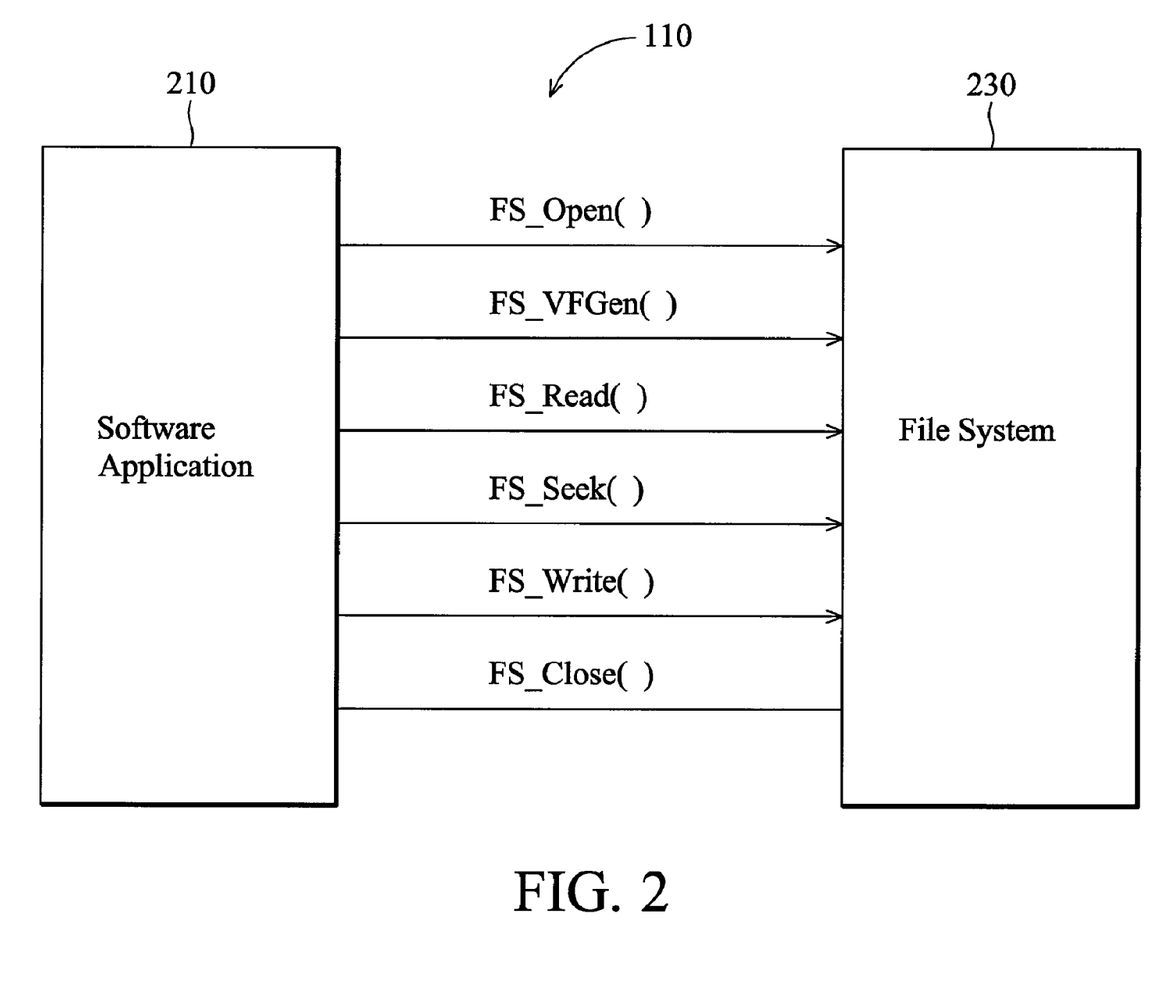
FIG. 2 shows the software architecture of file system management.

FIG. 2 shows the software architecture of file system management, comprising a software application 210 and a file system 230. The file system 230 provides six APIs, such as "FS_Open", "FS_VFGen", "FS_Read", "FS_Write", "FS_Seed", and "FS Close", for manipulation of large files in non-volatile storage device 130 (FIG. 1) by software application 210. The software application 210 can open and manipulate two file types, physical files and virtual files, via the provided APIs of the file system 230. After calling "FS_Open" to open a physical file, software application 210 may call "FS_Seek" or "FS_Read" to seek or read data respectively from the physical file, or may call "FS_Write" to write data to the physical file. When the software application 210 calls "FS_VFGen" to generate a virtual file corresponding to a physical file and provides a corresponding physical file handle and mapping information of a segment of the physical file, the file system 230 generates a virtual file name comprising the provided physical file handle and mapping information. When opening the created virtual file by calling "FS_Open", the software application 210 may call "FS_Seek" or "FS_Read" to seek or read data respectively from a portion of the physical file.

When opening a physical file, software application 210 calls the API "FS_Open" and provides a physical file name with a logical drive identifier and a logical path (i.e. a full physical file name) to the file system 230, for example, FS_Open("C:\DIR\FILE.EXT"), where "C:\" indicates a logical drive identifier, "DIR\" indicates a logical path following the logical drive identifier, and "FILE.EXT" indicates a physical file name stored in the indicated logical drive and the logical path. Subsequently, the file system 230 creates and stores physical file handle context in the volatile memory device 150 (FIG. 1), and responds to the software application 210 with the created physical file handle. The physical file handle is a temporary reference (typically a number) assigned by the file system 230 to the designated physical file corresponding to the file open request of software application 210. The physical file handle is used throughout the session to access the designated physical file. When opening a virtual file corresponding to a physical file, the software application 210 can also call the same API "FS_Open" and provide a virtual file name containing mapping information regarding a physical file handle, an offset from the beginning of the corresponding physical file, and a length of a segment of the corresponding physical file, for example, FS_Open ("\\PSEUDOFILE\56324170\CHECKSUM\1024\2048"), where "\\PSEUDOFILE" indicates the keyword of virtual file, "56324170" indicates a physical file handle, "1024" indicates a offset from the beginning of the corresponding physical file of bytes, and "2048" indicates a length of a segment of the corresponding physical file of bytes. The offset and the length may be also called segment information. Those skilled in the art will also realize that the segment information in two offsets, such as a start offset from the beginning of the corresponding physical file, and an end offset from the beginning of the corresponding physical file, describe a segment of the corresponding physical file. Subsequently, the file system 230 creates and stores virtual file handle context in the volatile memory device 150 (FIG. 1), and responds to the software application 210 with the created virtual file handle. The virtual file handle is also a temporary reference (typically a number) assigned by the file system 230 to the designated virtual file corresponding to file open request of software application 210.

Figure 3:
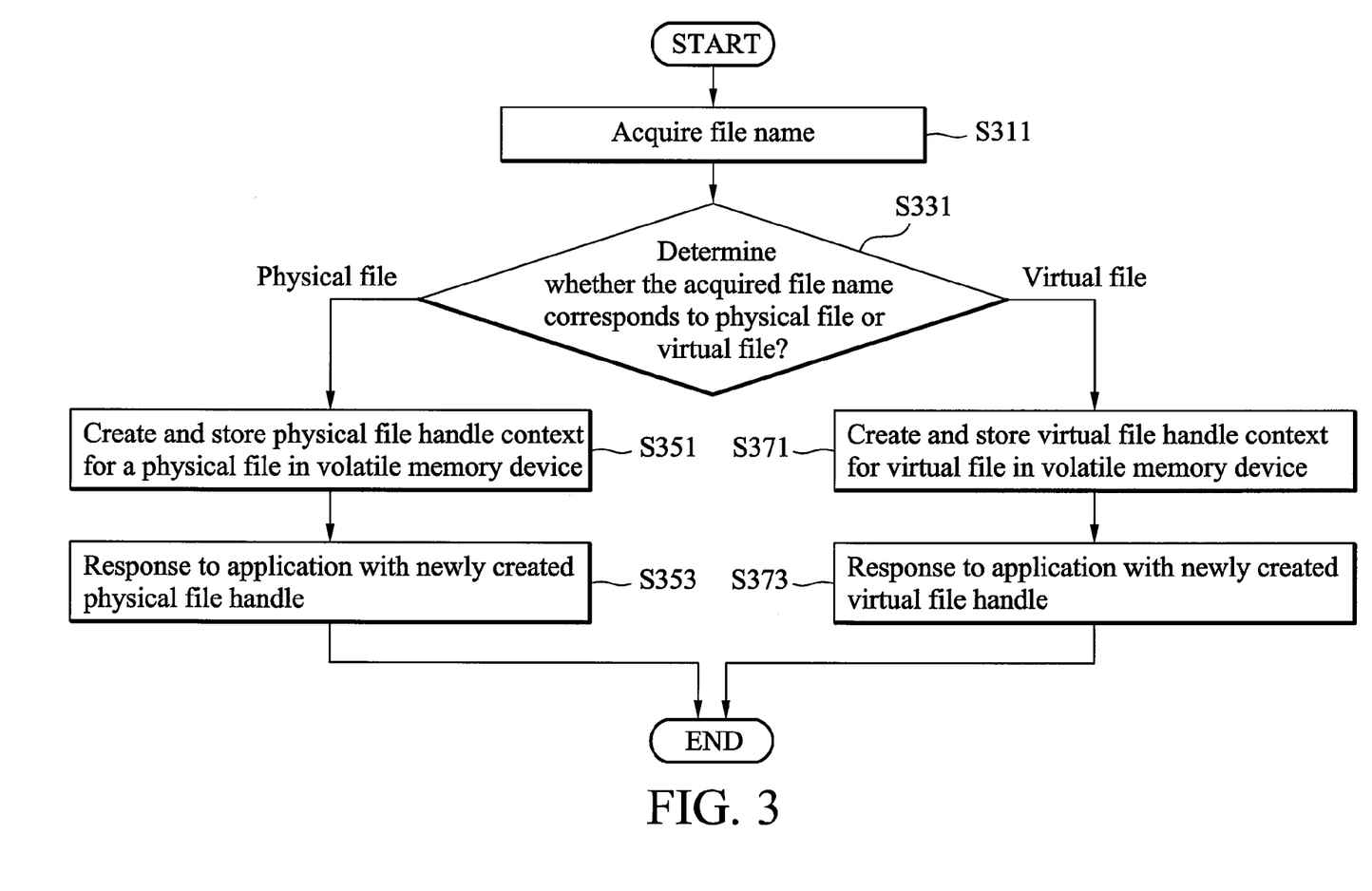
FIG. 3 is a flowchart illustrating an embodiment of a file open method.

FIG. 3 is a flowchart illustrating an embodiment of a file open method, performed by the file system 230 (FIG. 2). In step S311, a file name is acquired via the provided API "FS_Open", where the provided API "FS_Open", when called, is a file open request issued from an application. The acquired file name may be a full physical file name or a virtual file name conforming to the previously described format. In step S331, it is determined whether the acquired file name corresponds to a physical file or a virtual file. When corresponding to a physical file, the process proceeds to steps S311 and S353, otherwise, to steps S371 and S373. The determination of physical or virtual file may be achieved by determining whether the acquired file name comprises a full physical file name or a virtual file name.

Figure 4:
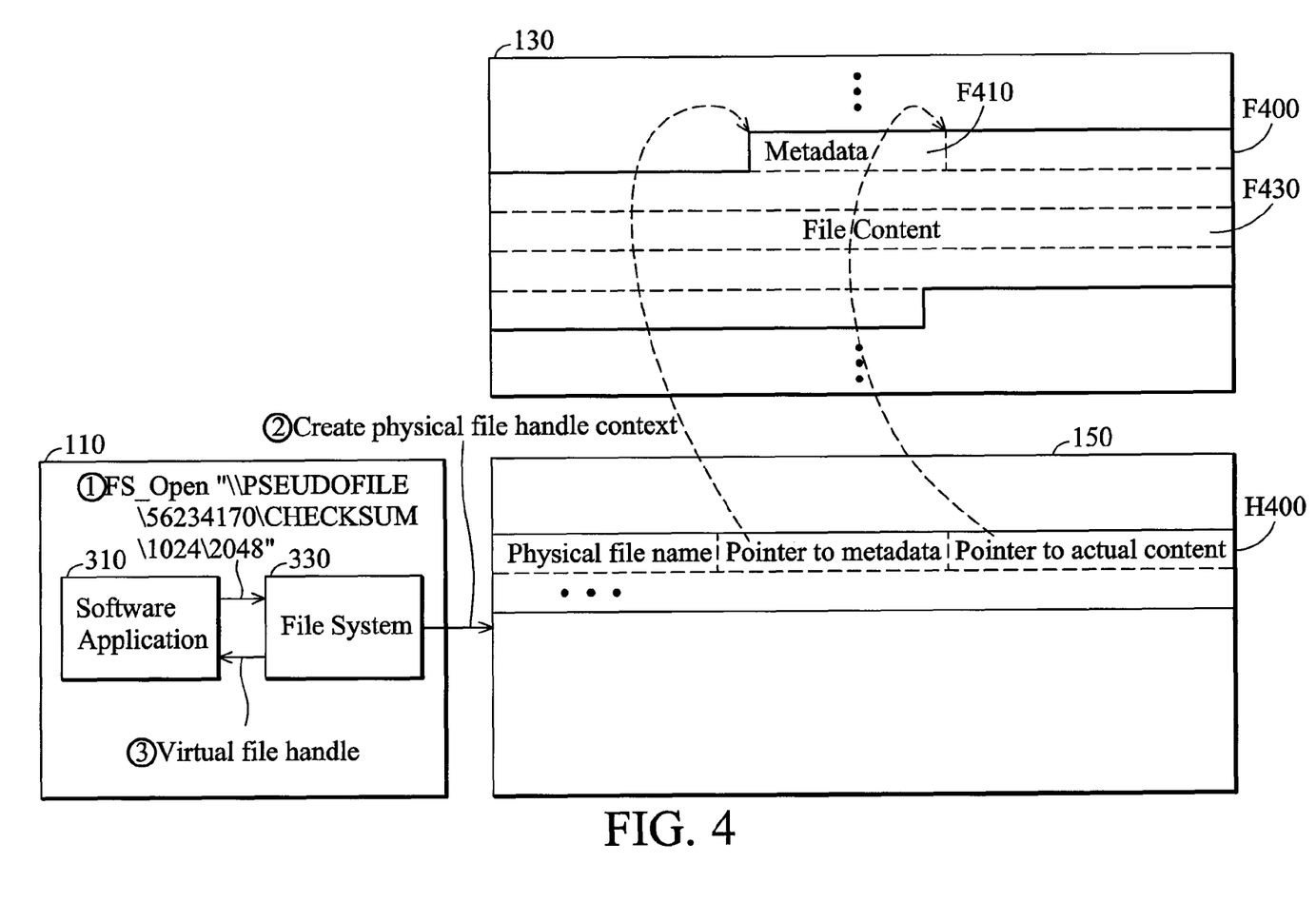
FIG. 4 is a diagram illustrating details of an exemplary physical file open operation.

In step S351, physical file handle context for a physical file is created and stored in the volatile memory device 150 (FIG. 1). In step S353, the file system 230 responses to the application with a newly created physical file handle. FIG. 4 is a diagram illustrating details of exemplary physical file open with reference to steps S311, S331, S351 and S353 (FIG. 3). After acquiring a physical file name of a physical file F400 (referring to step S311 of FIG. 3), the file system 330 creates and stores physical file handle context H400 providing relevant information for accessing the opened physical file F400 in the volatile memory device 150 (referring to step S351 of FIG. 3). The physical file F400 contains metadata F410, and actual file content F430. The metadata F410 may comprise supplementary information of the physical file F400, such as a file index, file properties, the stored directory or path of the non-volatile storage device 130, or others. The physical file handle context H400 mainly contains a physical file name, the duplication of the metadata F410 of the non-volatile storage device 130, a pointer to the beginning of the metadata F410 of the non-volatile storage device 130, a pointer to the beginning of the actual file content F430 of the non-volatile storage device 130, a current offset (i.e. a current access position) from the beginning of the stored actual file content F430, or others. After creating and storing the file handle context H400, the file system 330 assigns and responds with a physical file handle for the opened physical file (referring to step S353).

Figure 5:
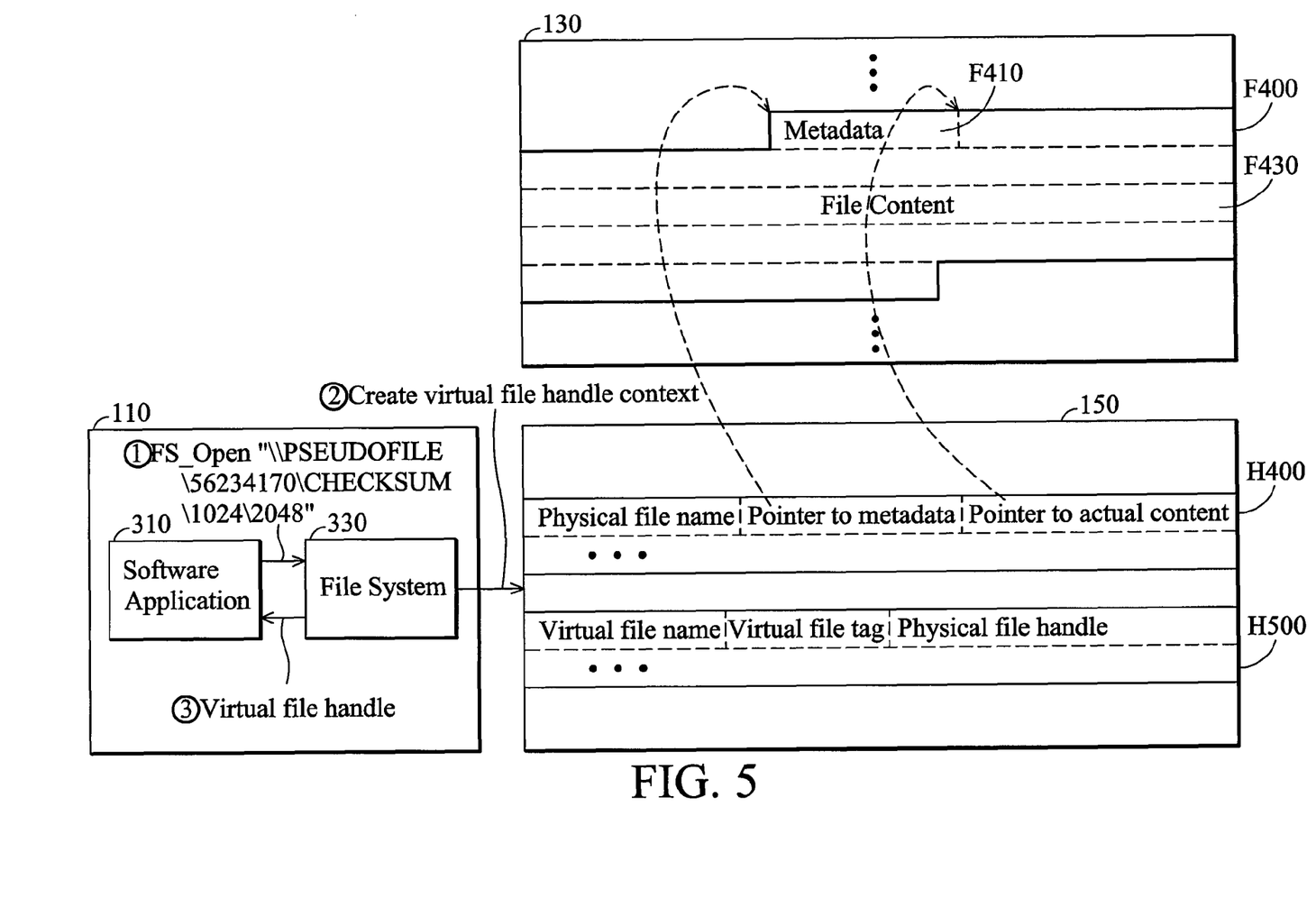
FIG. 5 is a diagram illustrating details of an exemplary virtual file open operation.

In step S371, virtual file handle context for a virtual file is created and stored in the volatile memory device 150 (FIG. 1). In step S373, the file system 230 responses to the application with a newly created virtual file handle. FIG. 5 is a diagram illustrating details of an exemplary virtual file open operation with reference to steps S311, S331, S371 and S373 (FIG. 3). After acquiring a virtual file name corresponding to previously opened physical file F400 (referring to step S311 of FIG. 3), the file system 330 extracts physical file handle and mapping information from the acquired virtual file name. Virtual file handle context H500 providing the extracted physical file handle and mapping information for accessing a portion of the opened physical file F400 is created and stored in the volatile memory device 150 (referring to step S371 of FIG. 3). The generation of virtual file name is to be described in detail in the following, and is only briefly described herein. The virtual file handle context H500 mainly contains: a virtual file name; a virtual file handle keyword or tag; the extracted physical file handle to the stored physical file handle context H400 of the volatile memory device 150; the extracted mapping information regarding a segment of the stored actual file content F430 of the non-volatile storage device F400; a current offset (i.e. a current access position) from the beginning of the virtual file, or others. After creating and storing the virtual file handle context H500, the file system 330 assigns and responds with a virtual file handle for the opened virtual file (referring to step S373).

Figure 6:
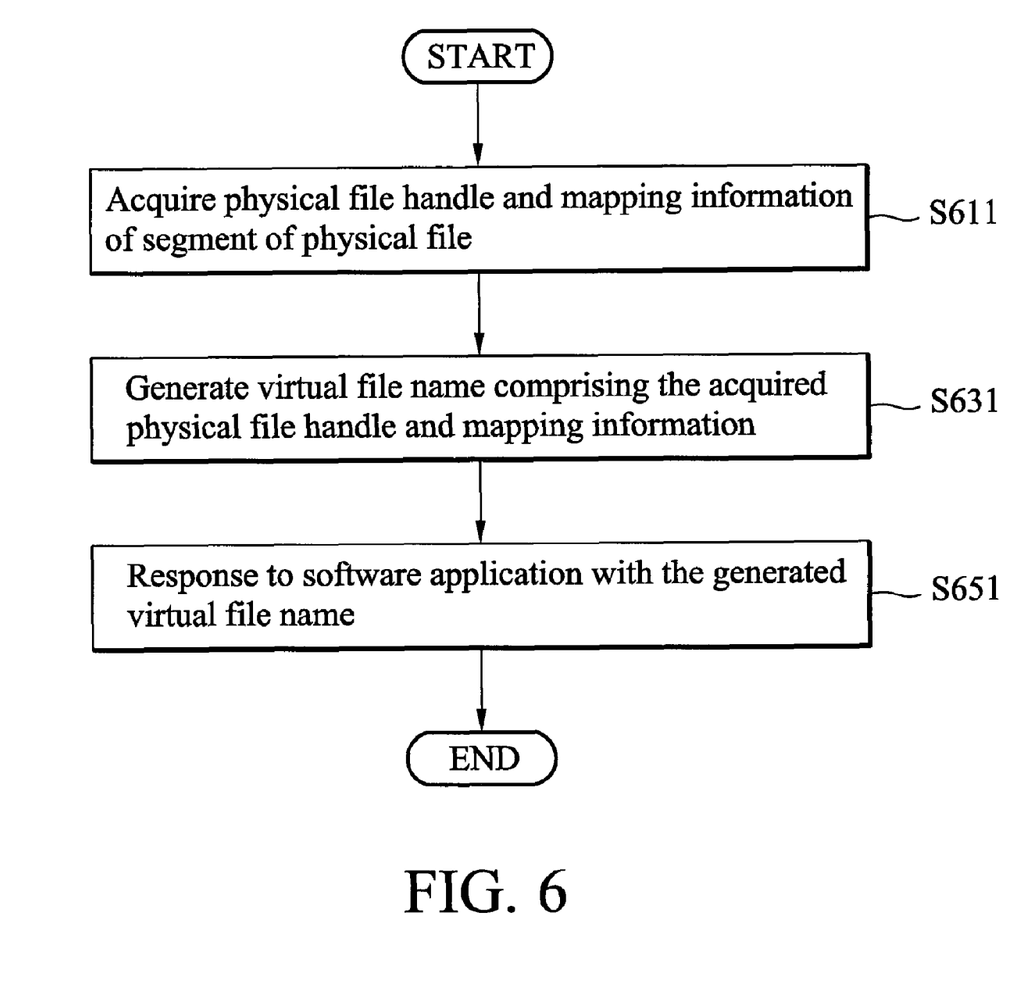
FIG. 6 is a flowchart illustrating an embodiment of a virtual file generation method.

When generating a virtual file, the software application 210 must call the API "FS_VFGen" and provide the previously acquired physical file handle and information regarding a segment of a physical file, for example, FS_VFGen (56234170,1024,2048), where "56234170" indicates a physical file handle, "1024" indicates an offset of bytes from the beginning of the corresponding physical file, and "2048" indicates a length of the segment of the corresponding physical file. Subsequently, the file system 230 generates a virtual file name comprising the provided physical file handle and information regarding the segment of physical file, for example, "\\PSEUDOFILE\56324170\CHECKSUM\1024\2048", and responds to the software application 210 with the generated virtual file name. The software application 210 can further utilize the generated virtual file name to open a virtual file. FIG. 6 is a flowchart illustrating an embodiment of a virtual file generation method, performed by the file system 230 (FIG. 2). In step S611, a physical file handle and mapping information of a segment of a physical file are acquired via the provided API "FS_VFGen", where the provided API "FS_VFGen", when called, is a virtual file generation request issued from an application. In step S631, a virtual file name comprising the acquired physical file handle and mapping information is generated. In step S651, the file system 210 responses to the software application 210 with the generated virtual file name.

Figure 7:
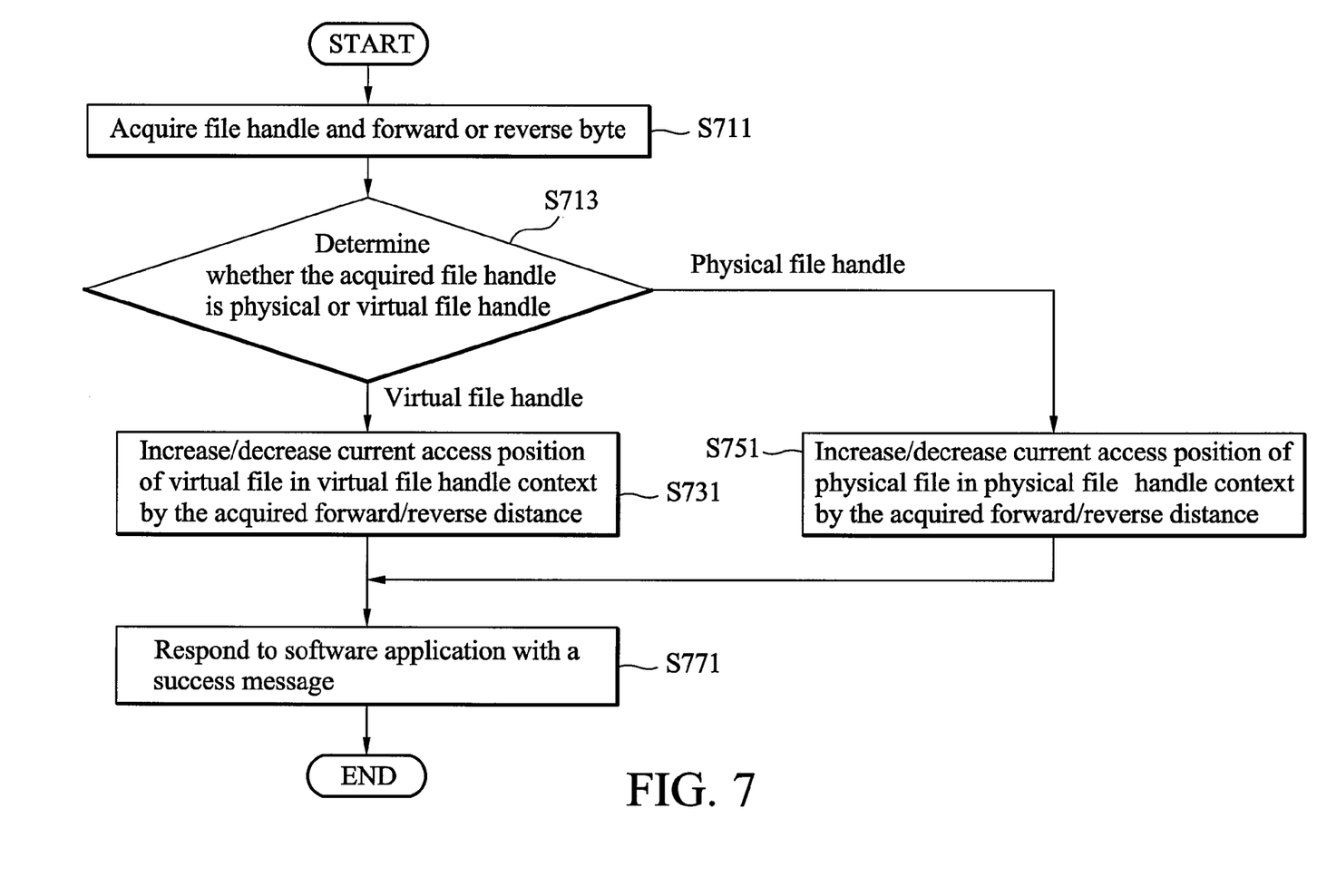
FIG. 7 is a flowchart illustrating an embodiment of a file seeking method.

When seeking a physical file, the software application 210 calls the API "FS_Seek" and provides the previously acquired physical file handle and forward/reverse distance of bytes, for example, FS_Seek(56234170,−10), where "56234170" indicates a physical file handle, and "−10" indicates a reverse distance of 10 bytes. Subsequently, the file system 230 modifies a current access position of the physical file in the physical file handle context H400 (FIG. 4) by increasing/decreasing the provided forward/reverse distance, and responds with a success message. Similarly, when seeking a virtual file, the software application 210 must call the same API "FS_Seek" and provide the previously acquired virtual file handle and forward/reverse distance of bytes, for example, FS_Seek (66234170,10), where "66324170" indicates a virtual file handle, and "10" indicates a forward distance of 10 bytes. Subsequently, the file system 230 modifies a current access position of the virtual file in the virtual file handle context H500 (FIG. 5) by increasing/decreasing the provided forward/reverse distance, and responds with a success message. FIG. 7 is a flowchart illustrating an embodiment of a file seeking method, performed by the file system 230 (FIG. 2). In step S711, a file handle and a forward or reverse byte are acquired via the API "FS_Seek", where the provided API "FS_Seek", when called, is a file seek request issued from an application. In step S713, it is determined whether the acquired file handle is a physical or virtual file handle. If the acquired file handle is a virtual file handle, the process proceeds to step S731, otherwise, to step S751. In step S731, a current access position of the virtual file in the virtual file handle context H500 (FIG. 5) is increased/decreased by the acquired forward/reverse distance. In step S751, a current access position of the physical file in the physical file handle context H400 (FIG. 4) is increased/decreased by the acquired forward/reverse distance. In step S771, the file system 230 responds to the software application 210 with a success message.

Figure 8A:
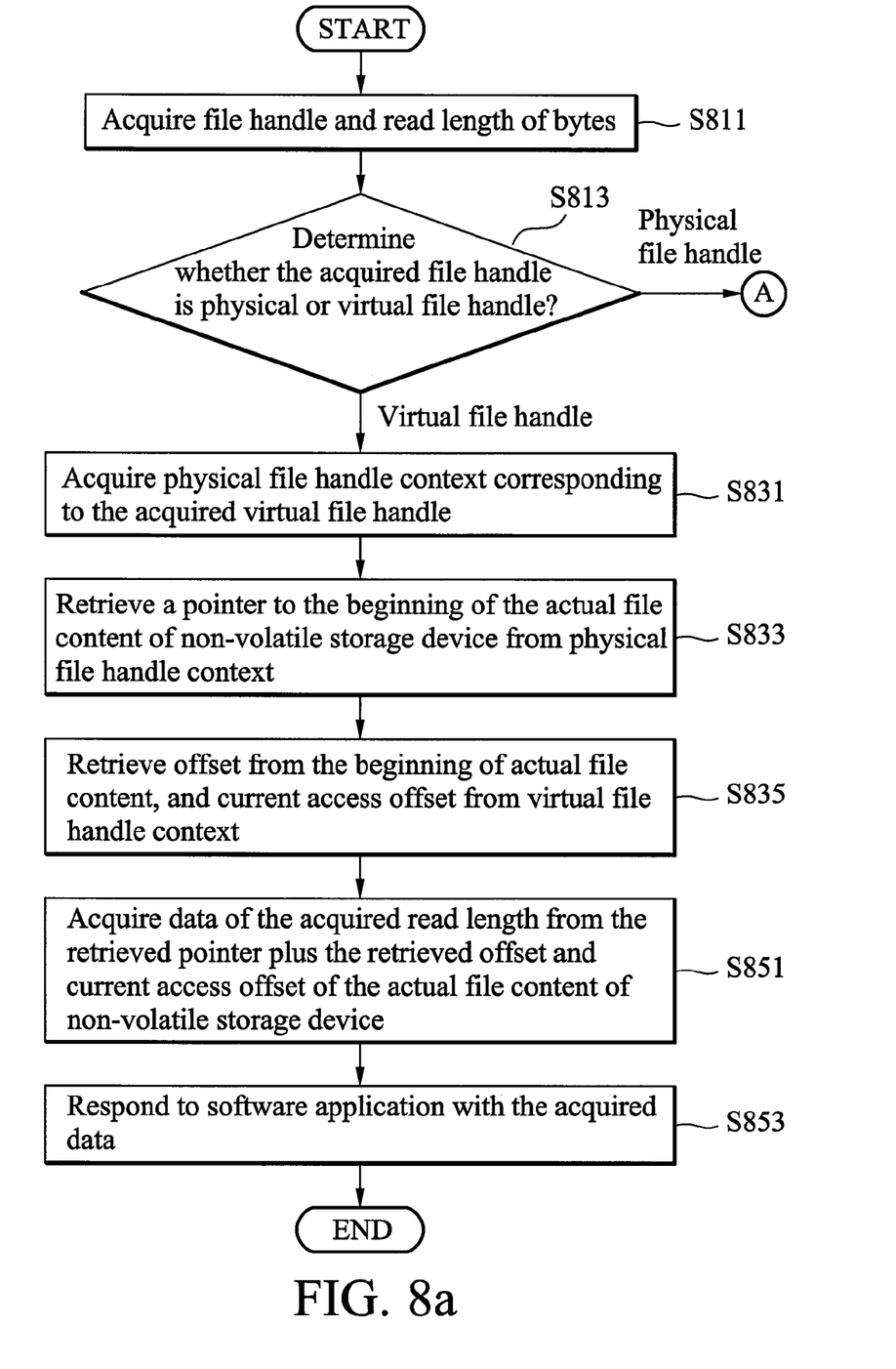
FIGS. 8A and 8B are flowcharts illustrating an embodiment of a file read method.
Figure 8B:
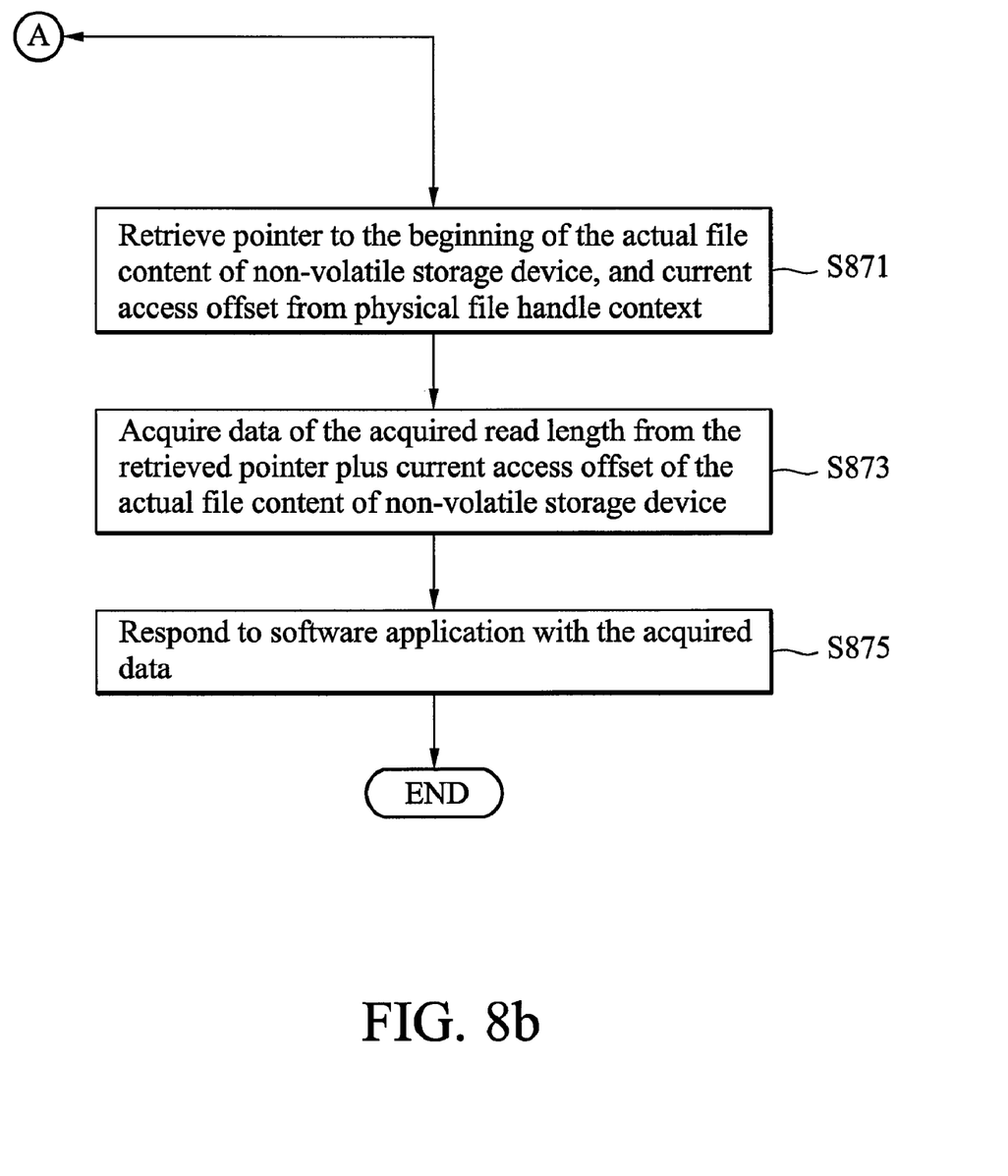

Software application 210 calls the API "FS_Read" to read a physical file and obtain the previously acquired physical file handle and a read length of bytes, for example, FS_Read (56234170,100), where "56234170" indicates a physical file handle, and "100" indicates a read length of 100 bytes. Subsequently, the file system 230 determines a start read position of the beginning of the actual file content F430 (FIG. 4) plus current access offset of the physical file handle context H400 (FIG. 4), acquires the read length data from the determined start read position of the actual file content F430, and responds with the acquired data. Similarly, when reading a virtual file, the software application 210 must call the API "FS_Read" and provide the previously acquired virtual file handle and a read length of bytes, for example, FS_Read (66234170,100), where "66234170" indicates a virtual file handle, and "100" indicates a read length of 100 bytes. Subsequently, the file system 230 determines a start read position of the beginning of the actual file content F430 (FIG. 5) plus the offset of the virtual file handle context H500 (FIG. 5) further plus current access offset of the virtual file handle context H500, acquires the read length data from the determined start read position of the actual file content F430, and responds with the acquired data. FIGS. 8A and 8B are flowcharts illustrating an embodiment of a file read method, performed by the file system 230 (FIG. 2). In step S811, a file handle and a read length of bytes are acquired via the provided API "FS_Read", where the provided API "FS_Read", when called, is a file read request issued from an application. In step S813, it is determined whether the acquired file handle is a physical or virtual file handle. If the acquired file handle is a virtual file handle, the process proceeds to steps S831 through S853, and otherwise, to steps S871 through S875. In step S831, physical file handle context corresponding to the acquired virtual file handle is acquired according to a pointer of the stored virtual file handle context. In step S833, a pointer to the beginning of the actual file content F430 (FIG. 5) of non-volatile storage device 130 (FIG. 5) is retrieved from the physical file handle context H400 (FIG. 5). In step S835, an offset from the beginning of the actual file content F430, and a current access offset are retrieved from the virtual file handle context H500 (FIG. 5). In step S851, data of the acquired read length is acquired from the retrieved pointer plus the retrieved offset and current access offset of the actual file content F430 of non-volatile storage device 130. In step S853, the file system 230 responds to the software application 210 with the acquired data. In step S871, a pointer to the beginning of the actual file content F430 (FIG. 4) of the non-volatile storage device 130 (FIG. 4), and a current access offset are acquired from the physical file handle context H400 (FIG. 4). In step S873, data of the acquired read length is acquired from the retrieved pointer plus current access offset of the actual file content F430 of the non-volatile storage device 130. In step S875, the file system 230 responds to the software application 210 with the acquired data.

Figure 9:
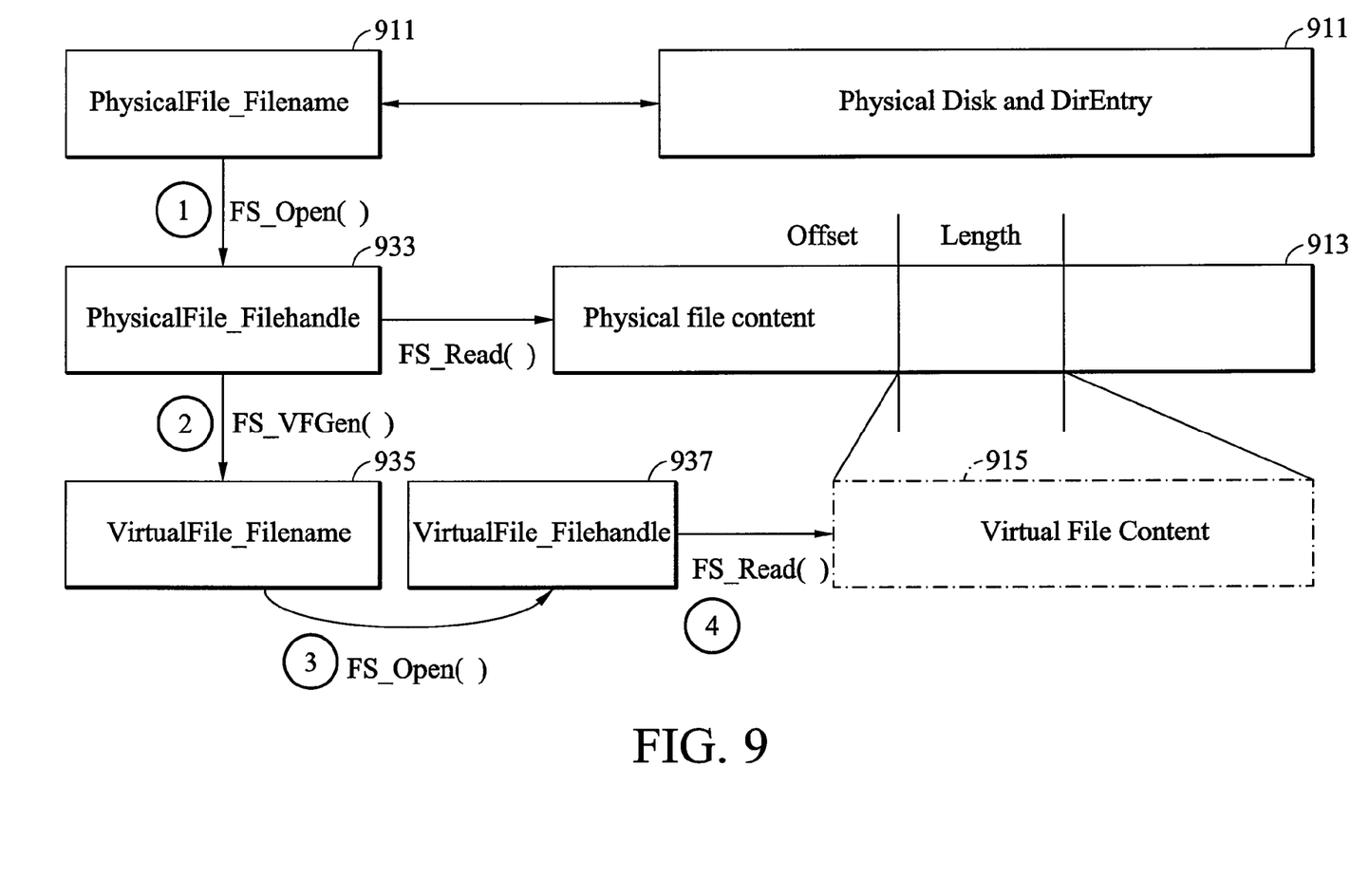
FIG. 9 is a diagram illustrating a scenario for creating and reading a virtual file.

FIG. 9 is a diagram illustrating a scenario for creating and reading a virtual file. Suppose that a theme file contains several still images, such as JPEG images, stored in a directory of a physical disk 911, and an application desires to read one of the still images. Referring to steps S311, S331, S351 and S353 of FIG. 3, the application acquires a physical file handle 933 after successfully opening the theme file via the API "FS_Open" with a physical file name for the theme file. Referring to steps S811, S813, S871, S873 and S875 of FIG. 8, the application can acquire the entire theme file via the API "FS_Read" with the newly acquired physical file handle 933. Referring to steps S611 to S651 of FIG. 6, the application can acquire a virtual file name 935 via the API "FS_VFGen" with the newly acquired physical file handle 933. Referring to steps S311, S331, S371 and S373 of FIG. 3, the application acquires a virtual file handle 937 after successfully opening a virtual file via the API "FS_Open" with the virtual file name 935 for one of the still images. Referring to steps S811, S813, S831, S833, S835, S851 and S853 of FIG. 8, the application can acquire one of the still images file via the API "FS_Read" with the newly acquired virtual file handle 937.

Methods for file system management, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a DVD recorder or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. An apparatus for file system management comprising:
    a non-volatile storage device storing a file containing actual file content;
    a volatile memory device storing physical file handle context comprising a pointer to the beginning of the actual file content; and
    a processing unit receiving a virtual file generation request with a physical file handle corresponding to the physical file handle context, and mapping information corresponding to a segment of the actual file content, and generating a virtual file name comprising the physical file handle and the mapping information, wherein:
        the processing unit receives a virtual file open request with the generated virtual file name, extracts the physical file handle and the mapping information, generates and stores virtual file handle context comprising the extracted physical file handle and mapping information, and assigns a virtual file handle to the generated virtual file handle context; and
        the processing unit receives a file read request with the virtual file handle and a read length, acquires the virtual file handle context corresponding to the virtual file handle, acquires the physical file handle from the virtual file handle context, acquires the physical file handle context corresponding to the acquired physical file handle, acquires the pointer to the beginning of the actual file content from the physical file handle context, acquires an offset from the beginning of the actual file content from the virtual file handle context, acquires the current access position from the beginning of the segment of the actual file content from the virtual file handle context, and acquires the read length data from the acquired pointer plus the acquired offset further plus the acquired current access position.

2. The apparatus as claimed in claim 1 wherein the mapping information regarding an offset from the beginning of the actual file content, and a length of the segment of the actual file content.

3. The apparatus as claimed in claim 1 wherein the mapping information regarding a start offset from the beginning of the actual file content, and an end offset from the beginning of the actual file content.

4. The apparatus as claimed in claim 1 wherein the virtual file handle context comprises a current access position from the beginning of the segment of the actual file content, and the processing unit receives a file seek request with the assigned virtual file handle and forward/reverse distance, and modifies the current access position of the segment of the actual file content of the virtual file handle context by increasing/decreasing the forward/reverse distance.

5. The apparatus as claimed in claim 1 wherein the physical file handle context comprises a current access position from the beginning of the actual file content, and the processing unit receives a file seek request with the assigned physical file handle and forward/reverse distance, and modifies the current access position of the actual file content of the physical file handle context by increasing/decreasing the forward/reverse distance.

6. The apparatus as claimed in claim 5 wherein the processing unit receives a file read request with the physical file handle and a read length, acquires the physical file handle context corresponding to the physical file handle, acquires the pointer to the beginning of the actual file content from the physical file handle context, acquires the current access position from the beginning of the actual file content from the physical file handle context, and acquires the read length data from the pointer plus the acquired current access position.

7. An apparatus for file system management comprising:
    a non-volatile storage device storing a file containing actual file content;
    a volatile memory device; and
    a processing unit, when receiving a file open request with a file name, determining whether the file name is a physical file name or a virtual file name, generating and storing physical file handle context comprising a pointer to the beginning of the actual file content in the volatile memory device and a current access position from the beginning of the actual file content when the file name is the physical file name and assigning a physical file handle corresponding to the physical file handle context, generating and storing virtual file handle context providing a physical file handle and a mapping information when the file name is the virtual file name and assigning a virtual file handle corresponding to the virtual file handle context when receiving a file read request with a file handle and a read length, determining whether the file handle is the physical file handle or the virtual file handle, acquiring the physical file handle context corresponding to the physical file handle when the file handle is the physical file handle, acquiring the pointer to the beginning of the actual file content from the physical file handle context, acquiring the current access position from the beginning of the actual file content from the physical file handle context, and acquiring read length data from the pointer plus the acquired current access position; wherein the virtual file name comprises the physical file handle and the mapping information, the physical file handle corresponds to a physical file handle context comprising a pointer to the beginning of the actual file content, and the mapping information corresponds to a segment of the actual file content in the volatile memory device.

8. The apparatus as claimed in claim 7 wherein the processing unit receives a file seek request with a file handle and forward/reverse distance, determines whether the file handle is the physical file handle or the virtual file handle, and modifies the current access position of the actual file content of the physical file handle context by increasing/decreasing the forward/reverse distance when the file handle is the physical file handle.

9. The apparatus as claimed in claim 7 wherein the virtual file handle context comprises a current access position from the beginning of the segment of the actual file content, and the processing unit receives a file seek request with a file handle and forward/reverse distance, determines whether the file handle is the physical file handle or the virtual file handle, and modifies the current access position of the segment of the actual file content of the virtual file handle context by increasing/decreasing the forward/reverse distance when the file handle is the virtual file handle.

10. The apparatus as claimed in claim 9 wherein the processing unit receives a file read request with a file handle and a read length, determines whether the file handle is the physical file handle or the virtual file handle, acquires the virtual file handle context corresponding to the virtual file handle when the file handle is the virtual file handle, acquires the physical file handle from the virtual file handle context, acquires the physical file handle context corresponding to the acquired physical file handle, acquires the pointer to the beginning of the actual file content from the physical file handle context, acquires an offset from the beginning of the actual file content from the virtual file handle context, acquires the current access position from the beginning of the segment of the actual file content from the virtual file handle context, and acquires read length data from the acquired pointer plus the acquired offset further plus the acquired current access position.

11. An apparatus for file system management comprising:

a non-volatile storage device storing a file containing actual file content;

a volatile memory device storing physical file handle context comprising a pointer to the beginning of the actual file content, and a current access position from the beginning of the actual file content, storing virtual file handle context providing the physical file handle, a current access position from the beginning of a segment of the actual file content, and mapping information corresponding to the segment of the actual file content; and a processing unit receiving a file seek request with a file handle and forward/reverse distance, determining whether the file handle is the physical file handle or the virtual file handle, modifying the current access position of the actual file content of the physical file handle context by increasing/decreasing the forward/reverse distance when the file handle is the physical file handle, and modifying the current access position of the segment of the actual file content of the virtual file handle context by increasing/decreasing the forward/reverse distance when the file handle is the virtual file handle; wherein:

the virtual file name comprises the physical file handle and the mapping information; and the processing unit receives a file read request with a file handle and a read length, determines whether the file handle is the physical file handle or the virtual file handle, acquires the virtual file handle context corresponding to the virtual file handle when the file handle is the virtual file handle, acquires the physical file handle from the virtual file handle context, acquires the physical file handle context corresponding to the acquired physical file handle, acquires the pointer to the beginning of the actual file content from the physical file handle context, acquires an offset from the beginning of the actual file content from the virtual file handle context, acquires the current access position from the beginning of the segment of the actual file content from the virtual file handle context, and acquires read length data from the acquired pointer plus the acquired offset further plus the acquired current access position.

12. The apparatus as claimed in claim 11 wherein the processing unit receives a file read request with a file handle and a read length, determines whether the file handle is the physical file handle or the virtual file handle, acquires the physical file handle context corresponding to the physical file handle when the file handle is the physical file handle, acquires the pointer to the beginning of the actual file content from the physical file handle context, acquires the current access position from the beginning of the actual file content from the physical file handle context, and acquires read length data from the pointer plus the acquired current access position.

* * * * *